Figure 1:
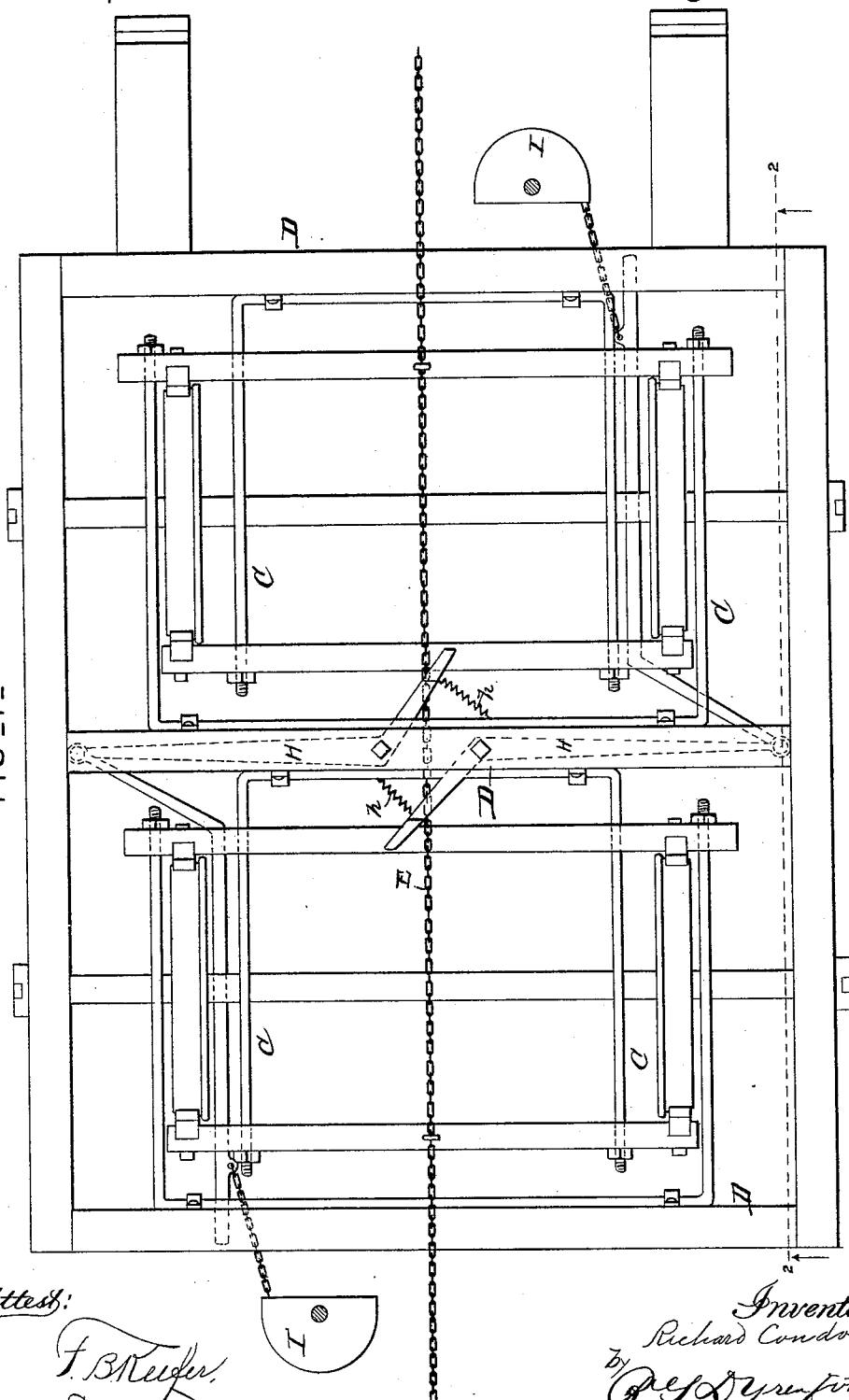

(No Model.) 4 Sheets—Sheet 1.

R. CONDON.
AUTOMATIC CAR BRAKE.

No. 480,250. Patented Aug. 9, 1892.

Attest:
F. B. Keifer

Inventor:
Richard Condon
by his attorney

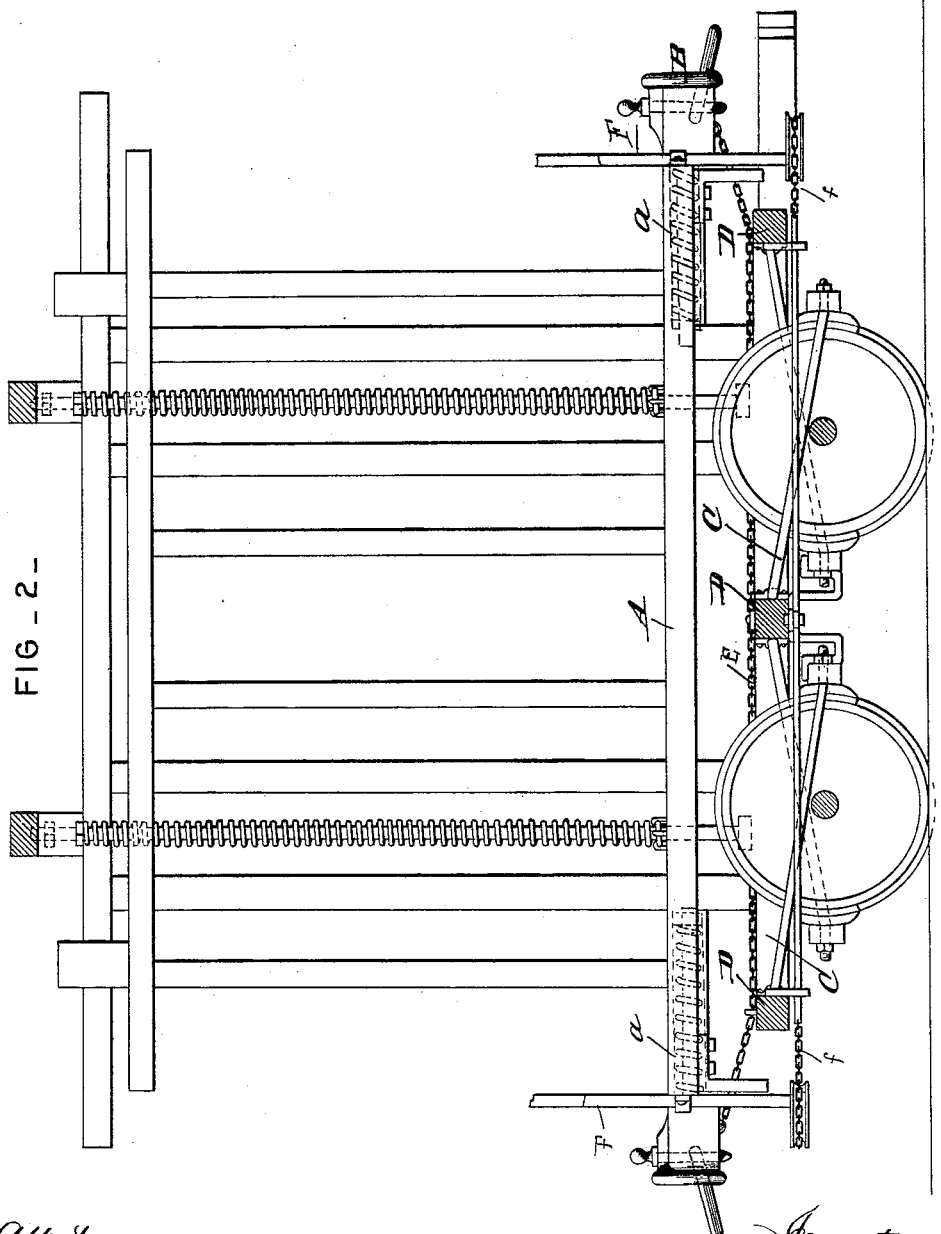

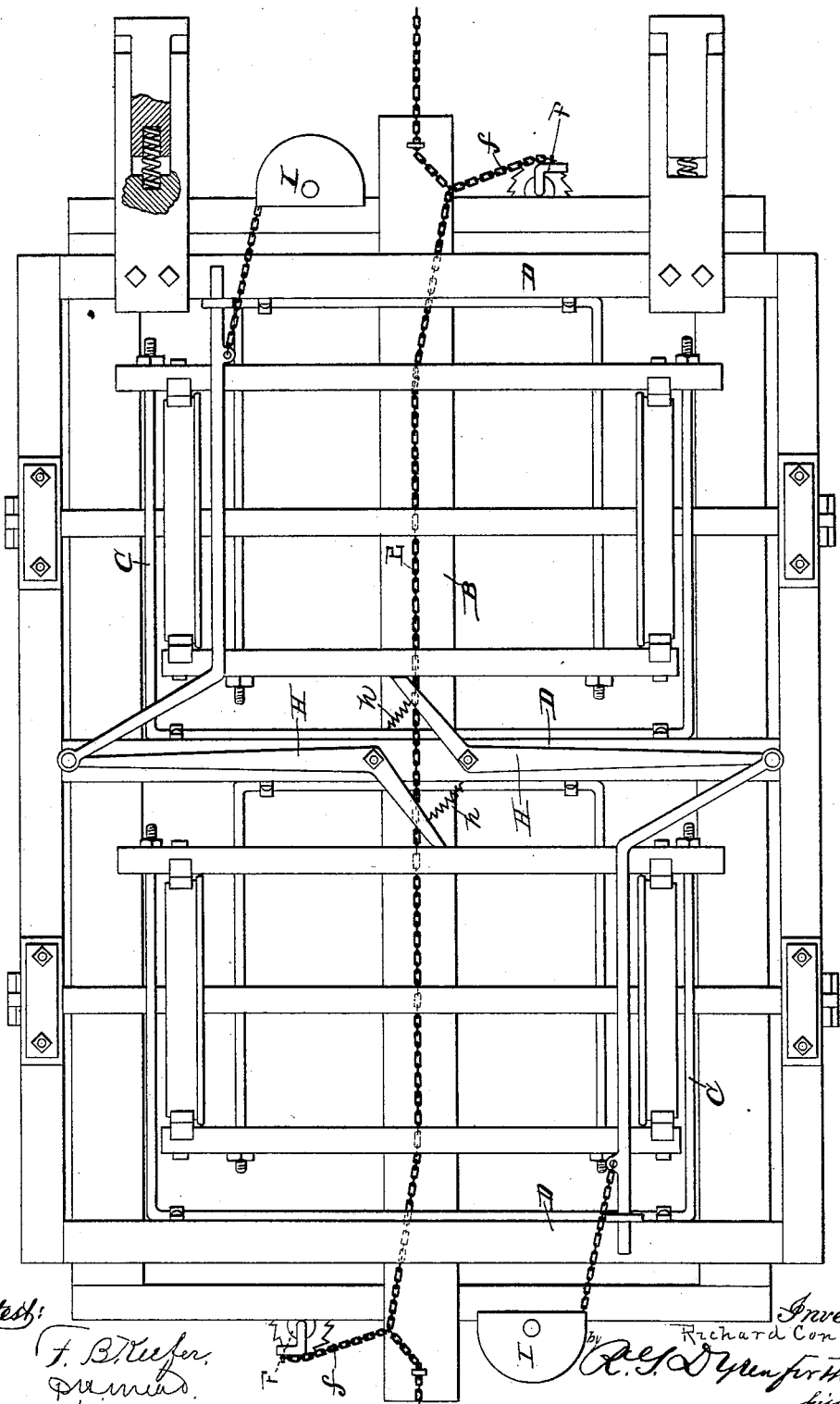

(No Model.) 4 Sheets—Sheet 4.
R. CONDON.
AUTOMATIC CAR BRAKE.
No. 480,250. Patented Aug. 9, 1892.
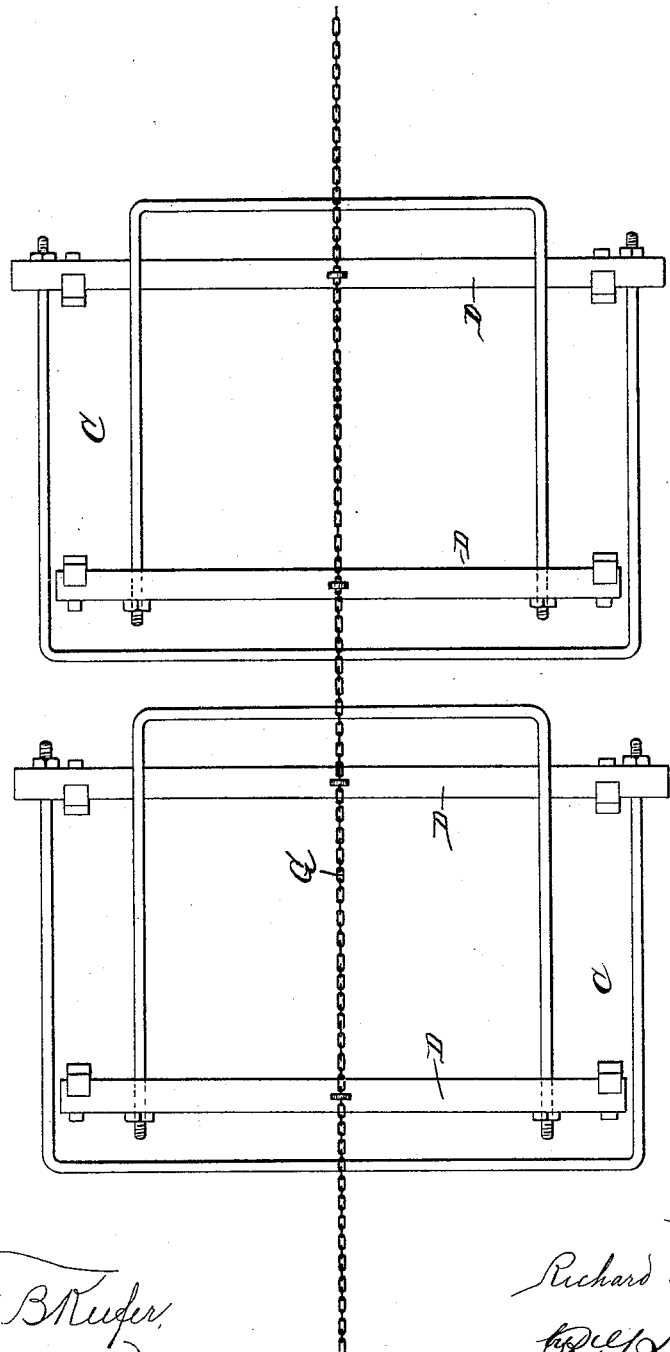
FIG_4_
Attest:
F. B. Kiefer,
D. A. Mead.
Inventor:
Richard Condon,
R. G. Dyrenforth
his attorney

UNITED STATES PATENT OFFICE.

RICHARD CONDON, OF LYONS, IOWA.

AUTOMATIC CAR-BRAKE.

SPECIFICATION forming part of Letters Patent No. 480,250, dated August 9, 1892.

Application filed January 29, 1889. Renewed April 22, 1892. Serial No. 430,170. (No model.)

*To all whom it may concern:*

Be it known that I, RICHARD CONDON, a citizen of the United States, residing at Lyons, in the county of Clinton and State of Iowa, have invented certain new and useful Improvements in Automatic Car-Brakes; and I do hereby declare the following to be a full, clear, and exact description of the invention, such as will enable others skilled in the art to which it appertains to make and use the same.

This invention relates to automatic car-brakes.

The object of the invention is to produce an automatic car-brake so constructed that when the locomotive is slacked up or stopped the brakes will be automatically applied and will be lifted from the wheels when the locomotive is started. Furthermore, the object of the invention is to produce an automatic car-brake which is so constructed that the brakes will automatically be applied when going downgrade or when the motive power is released or may be applied by hand in the ordinary manner, if desired.

With these objects in view the invention resides in an automatic-brake apparatus comprising loosely-hung brake-bars, arranged above the wheels on movable draw-heads, and a chain or the like connected to the draw-heads and to the brake-bars, whereby when the draw-heads are drawn out the brakes are lifted from the wheels and when the draw-heads are retracted or forced backward the brakes are allowed to drop upon the wheels and impede their turning.

Furthermore, the invention resides in a brake comprising a brake-bar loosely mounted above the wheels, and a rope or chain passing under the brake-bars attached to the rear end of the train and to the locomotive, whereby when the locomotive is started or is in motion the rope or chain is held taut and the brake-bars elevated from the wheels, and when the locomotive is slacked or stopped the brakes are allowed to drop upon the wheels, and, furthermore, the invention resides in various novel details of construction whereby the objects of the invention are attained.

I have illustrated the invention in the accompanying drawings, in which—

Figure 1 is a plan view of the truck of a car constructed to embody my invention, the top of the car being removed to disclose the arrangement of parts. Fig. 2 is a side elevation. Fig. 3 is an inverted plan view, and Fig. 4 is a detail view showing the arrangement of the brake-bars and frame and the rod or chain by which the brake-bars are operated.

In the drawings, A represents the bed or floor of a car, of which the platforms $a$ are extensions, as usual.

B represents the couplings, the draw-heads of which, as usual, are permitted a limited longitudinal movement independent of the car to which they are attached.

Attached to suitable cross-pieces beneath the floor of the car are the brake-bars C, each carrying suitable brake-shoes at appropriate places over the wheels. Each of these brake-bars is mounted upon the end of a frame, (designated by the letter D,) so connected to the frame of the car as to permit free up-and-down movement to bring the brake-shoes on the brake-bars into contact with or away from the wheels.

In order that the brakes may automatically be operated by the movement of the locomotive, I provide the chain E, which is connected to the draw-heads and also to the brake-bars, so that as the draw-heads are drawn out the chain or rod E is tightened and the brake-frame carrying the brakes raised from the wheels. Thus it will be seen that as the cars are started, or during the drawing of the train by the locomotive, the brakes are held free from the wheels, allowing them to turn freely; but as soon as the momentum is checked or the train stopped the brakes are allowed to drop upon the wheels, and, as will be clear from their construction, it is only necessary to allow them to come in contact with the wheels to put them in operation, the turning of the wheel itself acting to put the brakes on. From this construction it will be seen that the brakes will be applied whenever in going downgrade the pulling on the draw-heads is slackened, and in order to prevent the application of the brakes in this instance I provide the standard F, mounted on the platform of the car and having wound around its lower end a supplemental chain $f$, which is connected with the chain E, so that when the brakes are automatically applied they may be raised by hand when it is desired to keep up the speed of the train.

G represents a chain, one end of which is attached at the rear end of the train and the other end connected with the locomotive, it being joined intermediately with the brake-frames of the cars of the train. This chain performs the same function as the chain E, and may be used either in connection with the chain G or as a substitute therefor.

If desired, I may provide, in connection with the automatic-brake mechanism, means consisting of the levers H, springs $h$, and standards I, provided with suitable connections with the brake-bars, whereby the brakes may be operated by hand.

Having thus fully described my invention, what I claim as new, and desire to secure by Letters Patent, is—

1. In an automatic brake, the brake-bars hung above the wheels and the chains connected with the brake-bars and with the sliding draw-head, substantially as described.

2. In an automatic brake, the brake-bars loosely hung above the wheels and the chain or rope connected to the rear end of the train and to the locomotive and attached to the brake-bars, substantially as described.

3. In an automatic brake, the brake-bars loosely hung above the wheels, the sliding draw-heads, the chain connected with the draw-heads and with the brake-bars, and the supplemental chain attached to the operating-chain and to the standards, substantially as described.

In testimony whereof I affix my signature in presence of two witnesses.

RICHARD CONDON.

Witnesses:
   DAVID H. MEAD,
   H. C. JOHNSON.